(12) United States Patent
Napier et al.

(10) Patent No.: US 12,007,543 B2
(45) Date of Patent: Jun. 11, 2024

(54) OPTICAL SYSTEM

(71) Applicant: HOCHSCHULE EMDEN/LEER, Emden (DE)

(72) Inventors: James Napier, Emden (DE); Walter Neu, Emden (DE)

(73) Assignee: HOCHSCHULE EMDEN/LEER, Emden (DE)

(*) Notice: Subject to any disclaimer, the term of this patent is extended or adjusted under 35 U.S.C. 154(b) by 0 days.

(21) Appl. No.: 18/006,219

(22) PCT Filed: Jul. 21, 2021

(86) PCT No.: PCT/EP2021/070447
§ 371 (c)(1),
(2) Date: Mar. 8, 2023

(87) PCT Pub. No.: WO2022/018167
PCT Pub. Date: Jan. 27, 2022

(65) Prior Publication Data
US 2023/0280574 A1    Sep. 7, 2023

(30) Foreign Application Priority Data

Jul. 22, 2020  (DE) .......................... 102020209268.0

(51) Int. Cl.
*G02B 21/00* (2006.01)
*G01J 1/04* (2006.01)
(Continued)

(52) U.S. Cl.
CPC ........ *G02B 21/0032* (2013.01); *G01J 1/0411* (2013.01); *G01J 1/0425* (2013.01);
(Continued)

(58) Field of Classification Search
CPC ... G02B 21/0032; G02B 27/146; G01J 1/0411
See application file for complete search history.

(56) References Cited

U.S. PATENT DOCUMENTS 5,978,155 A * 11/1999 Suenaga ................ G02B 21/02
359/691
10,209,056 B2   2/2019 Yamauchi et al.
(Continued)

FOREIGN PATENT DOCUMENTS

DE      10343722 A1   4/2005
DE    102008062791 A1   7/2010
(Continued)

OTHER PUBLICATIONS

Bigelow, et al., "Microbeam-integrated multiphoton imaging system", Review of Scientific Instruments, 2008, vol. 79, pp. 123707-1-123707-6.
(Continued)

*Primary Examiner* — Thanh Luu
(74) *Attorney, Agent, or Firm* — Greer, Burns & Crain, Ltd.; Steven P. Fallon

(57) ABSTRACT

This relates to an optical system for detecting radiation from a measuring area, comprising at least one radiation source for generating radiation along an excitation beam path which guides radiation from the radiation source to the measuring area, and comprising a detection beam path which guides radiation from the measuring area to at least a first and a second detector, wherein along the detection beam path, exactly one tube lens having a first end and an opposite second end, a first beam splitter, a first detector in the reflection direction of the first beam splitter, and a second detector in the transmission direction of the first beam splitter are arranged in succession, wherein the first detector has a first detection surface and the second detector has a second detection surface which is spaced from the first detection surface, (Continued)

Figure 1:
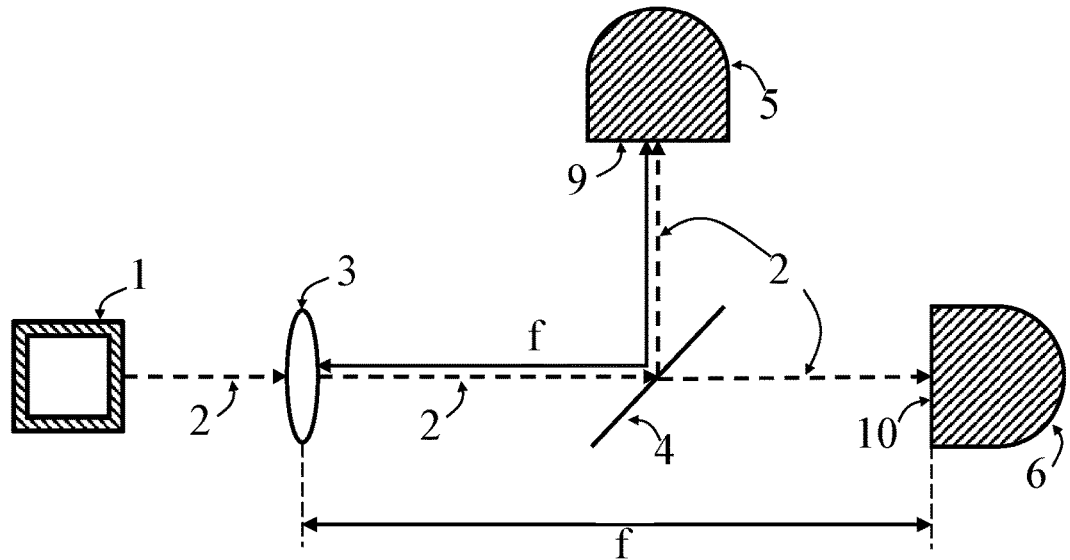

and the first and second detection surfaces are arranged along the detection beam path at the same distance from the second end of the tube lens.

13 Claims, 5 Drawing Sheets

(51) Int. Cl.
*G02B 27/14* (2006.01)
*G02B 21/33* (2006.01)
*G02B 26/08* (2006.01)

(52) U.S. Cl.
CPC ......... *G02B 21/008* (2013.01); *G02B 27/146* (2013.01); *G02B 21/0056* (2013.01); *G02B 21/0076* (2013.01); *G02B 21/33* (2013.01); *G02B 26/08* (2013.01)

(56) References Cited

U.S. PATENT DOCUMENTS

| | | | |
|---|---|---|---|
| 11,500,189 B2 | 11/2022 | Weiss et al. | |
| 2001/0022341 A1 | 9/2001 | Adachi et al. | |
| 2004/0125439 A1* | 7/2004 | Euteneuer | G02B 21/0088 359/368 |
| 2007/0262232 A1* | 11/2007 | Sander | G02B 7/32 250/201.3 |
| 2012/0113431 A1 | 5/2012 | Fukuma et al. | |
| 2017/0059299 A1 | 3/2017 | Safrani et al. | |
| 2017/0336329 A1 | 11/2017 | Li et al. | |
| 2019/0323953 A1* | 10/2019 | Hornqvist | G01N 21/05 |
| 2020/0099861 A1* | 3/2020 | Wayne | G02B 27/0068 |
| 2021/0173203 A1* | 6/2021 | Uhl | G02B 27/141 |

FOREIGN PATENT DOCUMENTS

| | | |
|---|---|---|
| DE | 102018129833 B4 | 1/2020 |
| EP | 2615967 B1 | 8/2017 |
| EP | 3614191 A1 | 2/2020 |

OTHER PUBLICATIONS

Georgescu, et al., "Free space variable optical attenuator using frustrated total internal reflection with 70 dB dynamic range", Applied Optics, 2018, vol. 57, No. 34, pp. 10051-10055.
Israelsen, et al., "Real-time high-resolution mid-infrared optical coherence tomography", Light: Science & Applications, 2019, vol. 8, Article No. 11, pp. 1-16.
Lodhi, et al., "Computational imaging through a fiber-optic bundle", Proc. of SPIE, 2017, vol. 10211, pp. 1021108-1-1021108-11.
Wayne, Randy, "Light and Video Microscopy", Elsevier Science & Technology, 2014.
Zheng, et al., "Three-dimensional super-resolved live cell imaging through polarized multi-angle TIRF", Optics Letters, 2018, vol. 43, No. 7, pp. 1423-1426.
International Search Report from the corresponding International Patent Application No. PCT/EP2021/070447, dated Jan. 25, 2022.
International Preliminary Report on Patentability from the corresponding International Patent Application No. PCT/EP2021/070447, dated Jan. 24, 2023.

* cited by examiner

OPTICAL SYSTEM

The present invention relates to an optical system and to a method that can be performed with it for detecting radiation from a measuring area. The optical system according to the invention is characterized in that it comprises several detectors for radiation and only exactly one tube lens.

Due to its special arrangement, the optical system according to the invention has the advantage that it is more space-saving than conventional optical systems having multiple tube lenses and that it can be used flexibly for various applications of the detection of radiation. In particular, the optical system is suitable as an optical microscope, especially for use as a device for optical biopsy, as a device for distance determination, e.g. by means of LIDAR or optical coherence tomography (OCT), or for interferometric relative and absolute distance determination methods, as a device for Raman spectroscopy and imaging, for fluorescence spectroscopy and imaging, e.g. by means of fluorescence lifetime measurements ("Fluorescence Lifetime Imaging Measurements", FLIM), for multiphoton microscopy, wide-field and scanning imaging and tomography, and/or as optical tweezers, and for other radiation-dependent sample treatment methods such as e.g. for polymerization processes.

Known optical systems having multiple detectors have beam splitters in the infinity region of a lens array and along the beam path between the beam splitter and the detector have a tube lens for each detector. These known systems have the advantage that the beam splitters are located in the infinity region and therefore distortions due to the beam splitters do not have a large effect on the signals detected by the detectors. These optical systems have the disadvantage that they can only be adjusted with great effort, since each tube lens must be aligned individually.

EP 2 615 967 B1 describes a microscope for multimodal optical sections that can simultaneously detect light by means of full-field OCT and fluorescence microscopy. The detected light is focused through an objective and a tube lens, wherein beam splitters are arranged in the infinity region between objective and tube lens to optically couple the detected signals to a time-of-flight reference.

OBJECT OF THE INVENTION

The invention has the object to provide an alternative optical system for detecting radiation from a sample or resp. for treating a sample with radiation. In particular, the invention has the object to provide an optical system which is simpler to construct than conventional systems and which is suitable for combining different detectors and radiation sources, each preferably having its own means for contrast enhancement.

DESCRIPTION OF THE INVENTION

The invention achieves the object by the features of the claims and in particular provides an optical system for detecting radiation from a measuring area, having at least one radiation source for generating radiation along an excitation beam path which guides radiation from the radiation source to the measuring area, and having a detection beam path which guides radiation from the measuring area onto at least a first and a second detector, wherein along the detection beam path, exactly one tube lens having a first and an opposite second end, a first beam splitter, a first detector in the reflection direction of the first beam splitter and a second detector in the transmission direction of the first beam splitter are arranged in succession, wherein the first detector has a first detection surface and the second detector has a second detection surface spaced from the first detection surface, and the first and the second detection surfaces are arranged along the detection beam path at the same distance to the second end of the tube lens.

By arrangement of the first beam splitter in the detection beam path downstream of the tube lens, the optical system has the advantage of being easy to adjust, e.g. being easier to adjust than optical systems with multiple tube lenses.

Further, the optical system has the advantage that it is set up for measurements of radiation from biological tissue, in particular for measurements of the optical biopsy, especially confocal optical coherence tomography (OCT), full-field OCT, confocal Raman spectroscopy, phase- and polarization-based imaging and tomography, fluorescence microscopy, multiphoton microscopy, resonance energy transfer (FRET), fluorescence lifetime (FLIM), or as optical tweezers or resp. an optical scalpel, simultaneously for the same measuring area.

The optical system comprises exactly one tube lens having a first and an opposite second end, which is arranged in the detection beam path between the measuring area and the first beam splitter. The tube lens is oriented with its first end toward the measuring area and with its second end toward the first beam splitter.

In general, it is preferred that the exactly one tube lens is arranged stationary along the detection beam path relative to the first beam splitter.

Preferably, the exactly one tube lens is arranged in the excitation beam path between the radiation source and the measuring area. In this embodiment, the exactly one tube lens is preferably arranged both in the excitation beam path and in the detection beam path, and the excitation beam path and the detection beam path at least in sections run on the same light path. In this embodiment, the optical system has the advantage that it can be arranged in a space-saving manner, e.g. completely in a housing.

The exactly one tube lens can be formed as a convex lens having an opening (aperture) with a diameter, such that along the detection beam path the radiation incident on the first end of the tube lens is refracted by the tube lens and is focused downstream of the tube lens at a distance from the second end of the tube lens, which is the focal length of the tube lens, and an image is formed at a distance from the second end of the tube lens, which is the working distance of the tube lens. Preferably, the tube lens has a working distance of at least 10 mm, preferably at least 100 mm up to 500 mm, preferably up to 200 mm. The working distance of the exactly one tube lens is preferably sufficient for allowing arrangement of the detectors and radiation sources necessary for the respective application in conjugated image planes or object planes spaced from one another, depending on the application, after the beam splitters have been passed. For this application, the practical limit for the working distance of the tube lens is equal to the diameter of the aperture of the tube lens.

Optionally, the aperture of the exactly one tube lens is smaller than its diameter, e.g. by an aperture frame arranged around the exactly one tube lens, which aperture frame is set up such that only the central region and not the peripheral regions of the tube lens are irradiated. Thus, the exactly one tube lens has the advantage that optical imperfections in its edge regions, which are usually due to manufacturing, are covered and do not deflect the radiation, so that fewer optical impurities are detected by the detectors without the working distance of the exactly one tube lens being changed.

Preferably, the optical system in the detection beam path upstream of the exactly one tube lens has a lens array as an objective having a first end and a second end spaced therefrom, which between them span a longitudinal axis. Preferably, the lenses of the objective are each spaced apart along the longitudinal axis. Generally, the objective is oriented with its first end toward the measuring area and with its second end toward the exactly one tube lens. The objective can be a microscope objective, e.g. an immersion objective, or can be a camera objective having multiple lenses.

Generally, the tube lens, or optionally the objective, which is preferably arranged upstream of the tube lens, is arranged at a distance from the measuring area which is equal to the working distance of the exactly one tube lens or optionally of the objective. Then, the radiation emanating from the measuring area is refracted by the tube lens and optionally by the objective and an image is formed at a distance downstream of the exactly one tube lens, which is the image distance of the tube lens. Generally, it is preferred that the detectors are arranged with their detection surfaces at a distance to the exactly one tube lens which is equal to the image distance of the tube lens, such that the detection surfaces of the optical system are arranged in the image plane of the exactly one tube lens.

Preferably, no beam splitters are arranged along the detection beam path between the first end and the second end of the objective. More preferably, the objective consists of lenses and optionally reflectors.

In the embodiment with an objective, the optical system preferably has an infinity region in its detection beam path in the region between the first end of the objective and the second end of the tube lens, i.e. the radiation at least sectionally radiates in parallel to the longitudinal axis of the objective. Thereby, the optical system has the advantage that when the distance between the first end of the objective and the second end of the tube lens is changed, the image distance of the tube lens remains unchanged and therefore the beam splitters and detectors do not have to be realigned.

The lenses of the objective can be fixed or can be run on bearings displaceably to the exactly one tube lens. In the embodiment with lenses which are displaceable to one another, the optical system has the advantage that the distance of the measuring area to the first end of the objective can be adjusted ad libitum without moving the measuring area towards or away from the tube lens, e.g. without changing the magnification and resolution of the optical system.

The optical system comprises a radiation source for generating radiation along an excitation beam path. The radiation source is preferably configured to generate radiation having a wavelength of at least 1 nm, preferably at least 5 nm or at least 100 nm up to 10,000 nm, preferably up to 2.000 nm, in particular for the fluorescence microscopy a wavelength of at least 300 nm up to 800 nm, for multi-photon fluorescence and/or frequency doubling and/or stimulated Raman spectroscopy a wavelength of at least 600 nm up to 1,600 nm, for optical tweezers a wavelength of at least 1,000 nm up to 2,000 nm, and/or for optical scalpels a wavelength of at least 100 nm up to 10,000 nm. The radiation generated by the radiation source can preferably have a low coherence length, especially for full-field OCT, and/or can have a low spectral bandwidth, especially for stimulated Raman spectroscopy.

The radiation source may be a point light source or a diffuse light source and is preferably selected from femtosecond lasers, picosecond lasers, pulsed lasers, continuous wave lasers, swept source lasers, tunable lasers, LED light sources, superluminescent LED light sources, optical tweezers or resp. laser scalpels, discharge lamps, thermal radiation sources, or a combination of at least two of these.

The radiation source can be arranged in a movable, preferably controlledly movable manner in the optical system, e.g. as a controlledly movable optical fiber. In this embodiment, the radiation source is preferably movable along two axes that are angled with respect to one another and span a plane that extends in perpendicular to the excitation beam path. In this embodiment, the optical system is preferably set up so that parts of the measuring area are successively irradiated, in particular scanned, by moving the radiation source, or resp. so that the radiation source can be aligned, e.g. by means of a localization equipment.

Optionally, the optical system has multiple radiation sources, which can e.g. be configured to simultaneously or successively generate radiation along a respective excitation beam path in the direction toward the measuring area. The excitation beam paths of different radiation sources may be spaced apart from one another or may overlap at least in sections. In this embodiment, at least one beam splitter is preferably arranged for each radiation source in its excitation beam path, which beam splitter redirects the radiation in the direction toward the measuring area.

Further optionally, the optical system comprises at least one optical element which is arranged in the excitation beam path and is arranged to successively direct the radiation generated by the radiation source onto parts of the measuring area. In this embodiment, the optical system is set up to irradiate the measuring area by irradiating parts of the measuring area in succession, for example by scanning. The optical element can be a beam splitter, in particular e.g. a digital or analog micro mirror actuator, or can be a spatial lens modulator (SLM) or a liquid crystal, a scanner mirror or at least one controlledly movable optical fiber, or can be a Nipkow disk.

Alternatively, the optical system can be set up such that the measuring area is irradiated by it simultaneously being irradiated uniformly or in a structured manner over its entire surface. Herein it is preferred that the optical system in its excitation beam path comprises an optical element arranged in the image plane of the exactly one tube lens, which optical element is set up to generate a structured irradiation, e.g. a diffraction grating, wherein preferably the period of the pattern generated by the optical element, e.g. the pitch period of the grating structure, is smaller than the diffraction limit of the radiation, in particular smaller than half the wavelength of the radiation irradiated through a diffraction grating onto the measuring area. Further preferably, in this embodiment, the optical element is run on bearings rotatably about an axis alongside the excitation beam path resp. alongside the optical axis, and the optical system is set up such that at least 3 images at different angles of rotation of the optical element are detected on the detection surfaces of the detectors within one complete rotation of the optical element about its axis. In this embodiment, the optical system has the advantage that it is set up to generate images having a higher spatial resolution, preferably below the diffraction limit of the radiation irradiated onto the measuring area.

Preferably, the optical system comprises a beam splitter arranged in the excitation beam path that directs the radiation in the direction toward the second end of the tube lens and, behind it, toward the measuring area. In this embodiment, the optical system is preferably set up such that the radiation generated by the radiation source is guided in the excitation beam path through the exactly one tube lens. In this embodiment, the optical system has the advantage that it is space-saving and e.g. the optical elements of the optical system, in particular the tube lens, beam splitter and detectors, can be arranged in a common housing. In this embodiment, the radiation source can be arranged in the housing, or can be arranged outside of the housing and can, for example, be guided into the housing by means of a fiber or a periscope.

Preferably, the radiation source is set up to emit optical radiation having at least two different wavelengths and/or different polarizations simultaneously or successively.

Optionally, the optical system has a beam splitter in its excitation beam path that directs the radiation in part toward the measuring area and in part toward the first and/or second detector. In this embodiment, the optical system is set up such that the radiation generated by the radiation source propagates at least partially into the detection beam path.

Optionally, the optical system in its excitation beam path has a beam splitter that directs the radiation partially toward a first measuring area and partially toward a second measuring area spaced from the first measuring area. In this embodiment, the optical system is set up to simultaneously or sequentially detect radiation from multiple spaced-apart measuring areas.

The radiation generated by the radiation source is guided through the excitation beam path to a measuring area. The measuring area is arranged at a distance from the first end of the tube lens or resp. from the first end of the objective, which distance is preferably equal to the working distance of the tube lens or optionally of the objective arranged between the measuring area and the first end of the tube lens and which distance defines the object plane. The radiation from the excitation beam path is at least partially absorbed, diffracted, scattered or reflected in the measuring area and is thereby at least partially redirected towards the first end of the tube lens as radiation emanating from the measuring area, which is the e.g. reflected, harmonized, diffracted or emitted radiation.

In the method of measuring radiation with the optical system, a sample may be placed into the measuring area. When a sample is arranged into the measuring area, the optical system is set up to detect radiation emanating from the sample, i.e. radiation reflected, harmonized, diffracted or emitted by the sample in the direction toward the first end of the tube lens, in particular to detect it in the first and/or second detector. The sample can be a biological sample, e.g. tissue, in particular tumor tissue, or can be a sample from which the distance to the first and/or second detector of the optical system is to be determined.

In the method of measuring radiation with the optical system, the sample may extend in the direction alongside the detection beam path. In this embodiment, the optical system is preferably set up to detect radiation from a focal region that extends along the object plane on or in the sample. In this embodiment, the measuring area is the focal region on or in the sample and is spaced from the first end of the tube lens or resp. from the first end of the objective by a working distance. The focal region preferably has an extent along the detection beam path that is less than 50 µm, preferably less than 10 µm. In the embodiment of the optical system with the lenses of the objective displaceable relative to one another and with the sample arranged in the measuring area, the sample can be stationarily fixed relative to the exactly one tube lens, such that the optical system is set up to displace the focal plane and thus the focal region by displacing the lenses of the objective one against the other without moving the sample towards or away from the tube lens. Alternatively, the sample can be arranged movably to the exactly one tube lens, so that the optical system is set up to move the focus region by moving the sample relative to the exactly one tube lens.

In the embodiment in which the optical elements of the optical system are arranged in a common housing, the optical system may comprise in the common housing a device arranged to fix the distance between the measuring area and the first end of the tube lens, e.g. a spacer for sample carrying slides, which spacer is configured so that a sample can be arranged at a fixed distance in front of the exactly one tube lens in the common housing. In this embodiment, the optical system is preferably set up such that the measuring area is arranged at a fixed distance in front of the exactly one tube lens in the common housing so that a sample to be measured can be arranged in the common housing. Thereby, the optical system has the advantage that a sample can be arranged and measured at a predetermined distance from the first end of the tube lens. Further preferably, in this embodiment, the measuring area is controlledly movable in perpendicular to the detection beam path so that the optical system is set up to successively irradiate or scan portions of the measuring area without the radiation source or a mirror or beam splitter being moved.

Radiation emanating from the measuring area is at least partially received by the detection beam path, which includes the exactly one tube lens. The optical system is generally arranged such that the radiation emanating from the measuring area along the detection beam path enters the first end of the tube lens and exits at the opposite second end of the tube lens and is incident onto the first beam splitter, in the reflection direction of which a first detector and in the transmission direction of which a second detector are arranged.

Starting from the measuring area, optionally an objective, the exactly one tube lens, the first beam splitter and in its reflection direction a first detector and in the transmission direction a second detector are arranged in succession along the detection beam path. Due to the arrangement of the beam splitters along the detection beam path downstream of the tube lens, the optical system has the advantage that only one tube lens is required and has to be aligned in order to detect radiation emanating from the measuring area with at least two detectors.

Optionally, along the detection beam path between the measuring area and the exactly one tube lens, or between the first and second ends of the objective, no optical elements other than lenses are arranged, or resp. there are arranged exclusively lenses. In this embodiment, the optical system has the advantage that no lenses other than the tube lens need to be arranged and aligned for detecting radiation from the measuring area.

Optionally, the detection beam path at least in sections is filled with liquid. In this embodiment, the detection beam path may be filled with liquid between the measuring area and the first end of the tube lens or resp. between the measuring area and the first end of the objective, wherein preferably the objective is an immersion objective. In this embodiment, the detection beam path in the fluid-filled section has a different refractive index, which is e.g. equal to the refractive index of biological tissue, in particular of human tissue, e.g. of skin. Thereby, the optical system has the advantage that radiation emanating from a sample, in particular from a biological tissue sample, can be detected better than without at least an at least sectionally liquid-filled detection beam path. In this embodiment, the optical system is optionally set up such that the liquid-filled section of the detection beam path is reversibly Tillable or emptiable, so that the optical system can be used to perform measurements in succession, once with a detection beam path that is at least sectionally filled with liquid and once with a detection beam path that is air-filled or empty and not filled with liquid.

In a preferred embodiment, the optical system in its excitation beam path has a beam splitter that redirects radiation emanating from the radiation source toward the second end of the tube lens and to the measuring area behind it. In this embodiment, the excitation beam path passes through the tube lens.

Further optionally, a fiber having a first end and a second end is arranged at least sectionally in the detection beam path and/or excitation beam path. The fiber is generally an optical fiber. Optical fibers are generally set up for light to be guided in the region between their first and second ends and, preferably, for the light guided therein to be reflected at their surface or at reflection surfaces and therefore to penetrate only out of the first and/or second end of the optical fiber. Preferably, the fiber is made of glass and/or comprises silicate. In particular, the fiber can be formed as a waveguide. Preferably, the detection beam path is at least sectionally formed by the fiber.

A fiber may e.g. form a section of the detection beam path. In particular, a fiber may form at least a section of the detection beam path that extends upstream of the tube lens, e.g., in a section that guides light from the measuring area to the exactly one tube lens or resp. to the first end of the objective.

Alternatively or additionally, a fiber may extend into or form the detection plane of a detector and may optionally be movable along two axes, thereby forming a scanning device.

A radiation source can be connected to a fiber, such that the fiber is adapted to generate radiation along an excitation beam path. In this embodiment, the fiber forms the radiation source. Preferably, a radiation source formed by a fiber is movable in a controlledly driven manner, e.g. movable by a scanning device, more preferably movable along at least two axes spanning a plane in perpendicular to its excitation beam path. Alternatively or additionally, a radiation source formed by a fiber can be rotatable or tiltable.

A fiber may include or form at least one beam splitter such that the fiber is adapted to redirect radiation out of the fiber or resp. to redirect radiation along the fiber.

A fiber may comprise a core clad by a cladding such that light guided therein is collected in its cladding by being reflected at the transition surfaces between core and cladding. Preferably, the cladding is light conducting. Further preferably, a clad fiber has multiple cladding layers and is formed, for example, as a cladding fiber (multi-cladding fiber) or as a clad waveguide.

A clad fiber may have a core through which light from a radiation source is guided. By simultaneously illuminating the measuring area from the core of the fiber and collecting the light emanating from the measuring area in the cladding of the fiber, such a fiber can act as an endoscope or reference light path for relative distance measurements.

At one of its ends, a fiber in perpendicular to its longitudinal axis may comprise a lens that extends across its cross-section. In particular, the lens may extend exclusively over the region of the clad core of a clad fiber, such that the lens does not extend over the cladding of the fiber. Alternatively, the lens may extend across and/or beyond the full cross-section of a fiber, preferably including the cladding of a clad fiber.

Alternatively or additionally, at one of its ends, a fiber in perpendicular to its longitudinal axis may comprise a reflector which extends at least sectionally across its cross-section. In particular, the reflector may extend exclusively over the region of the cladding of a clad fiber, so that the reflector does not extend over the core of the fiber. Alternatively, the reflector may extend across and/or beyond the full cross-section of a fiber, preferably including the cladding of a clad fiber.

In a preferred embodiment, the optical system comprises a clad fiber having at its first end a reflector arranged in the region of the cladding and at the same end a lens arranged in the region of the clad core. In this embodiment, the fiber is preferably arranged in the detection beam path between the measuring area and the tube lens and is aligned with its first end in the direction toward the measuring area, and in the region of its cladding is set up for determining a travel time as a reference value, so that the fiber is set up for use in measurement methods that require a reference value. A reference value can e.g. be assigned to radiation that does not impinge on the measuring area, e.g. assigned to an internal calibration, e.g. to the travel time between emitting the radiation by the radiation source and detecting the radiation reflected back by the reflector. Then, for example, the distance to an object located in the measuring area that reflects the radiation can be determined by comparing the light travel time with the reference value.

The fiber, especially when it forms a section of the detection beam path upstream of the first end of the tube lens, may have a length of at least 1 m, preferably at least 10 m. Such an optical system preferably comprises a detector which is configured to detect signals at a detection rate of at least 50 MHz to determine travel times or travel time differences between the cladding and the core of the fiber. Preferably, in this embodiment, the detector is configured such that its detection rate enables the determination of the distance of objects spaced from its detection surface by at least the length of the fiber. In this embodiment, the optical system is further set up to detect multiple pulses of radiation and thus for repeated determination of distance, in particular for determination of a speed of movement of the measuring area to the optical system. Such a detector may e.g. form the first detector or the second detector.

The optical system comprises a first beam splitter arranged in the detection beam path downstream of the exactly one tube lens and upstream of the first and second detectors, respectively. Beam splitters are generally configured to redirect, e.g. reflect and/or diffract, the radiation, e.g. consisting of light, at least partially in a reflection direction and to let it pass at least partially through the beam splitter in a transmission direction. Therein, the radiation can be radiation emanating from the measuring area or passing through the tube lens along the detection beam path, or can be radiation emanating from the radiation source along the excitation beam path.

In contrast to conventional optical systems, according to the invention the first beam splitter is not arranged in the detection beam path in the region upstream of a tube lens, but within the working distance downstream of the exactly one tube lens. Surprisingly, an optical system with the arrangement according to the invention of exactly one tube lens, a first beam splitter and at least one first and one second detector is suitable for detecting radiation from a measuring area in a space-saving design.

In particular, the first beam splitter is arranged to redirect radiation in its reflection direction toward a first detector and to transmit radiation in its transmission direction to a second detector.

Optionally, the optical system additionally comprises a second beam splitter which is arranged along the detection beam path downstream of the first beam splitter and in the reflection direction and/or transmission direction of which at least one detector is arranged. Further optionally, the optical system can have further beam splitters which can be arranged along the detection beam path and/or excitation beam path and in the reflection direction and/or transmission direction of which further detectors and/or radiation sources and/or other optical elements such as reflectors can be arranged.

In particular, the beam splitters can be configured to redirect or transmit predetermined portions of the radiation, e.g. to transmit light of a predetermined wavelength range and to redirect light of a wavelength outside the predetermined range, or to transmit light of certain polarization and to redirect light having a different polarization, or to transmit light at predetermined times and to redirect it at other times, or to transmit light from one direction and at least partially redirect light from another, e.g. opposite, direction.

Generally preferably, the beam splitters are arranged along the detection beam path at a distance from the second end of the tube lens that is smaller than the working distance of the tube lens.

The beam splitters are generally arranged at an angle to the detection beam path, which angle can e.g. be a right angle, or can e.g. be an angle of at least 1°, preferably at least 20°, 30°, 40°, up to 60° or up to 80°, preferably of 45°.

Preferably, the beam splitters, independent of one another different or the same, are selected from cube prisms, semi-transparent mirrors, reflective beam splitters, micro mirror actuators, pellicle beam splitters, scanning lenses, spatial light modulators (SLM), fiber optic splitters, optical circulators, wavelength-dependent chromatic beam splitters, or interference beam splitters, e.g., with fixed or adjustable interference pattern, or Fabry-Pérot resonators.

Preferably, the beam splitters have a wavefront error of at most one quarter, preferably at most one eighth or at most one tenth of the wavelength of the radiation redirected by the beam splitter. The beam splitters may be selected to reduce the wavefront errors generated by the selected beam splitters, e.g., by adaptive optics, e.g., by deformable mirrors and/or lenses, or by fixed corrective optical elements in the detection beam path between the second end of the tube lens and the first and/or second detector. Alternatively or additionally, the wavefront errors generated by the beam splitters can be reduced by combining certain beam splitters.

In one embodiment, at least one beam splitter can be formed as an optical switch that is configured to control the redirection or transmission of radiation, in particular to control it in dependence of a predetermined signal. The signal can be a signal for the travel time of photons (LIDAR), or an interference signal for determining the depth or relative distance between structures (OCT), or a signal for a relative change in radiation intensity, or a signal for a change in radiation polarization. In this embodiment, redirecting or transmitting may be controlled, e.g., by the micromirrors of a micromirror actuator tilting in a controlled manner, or by the subprisms of a cube prism being driven in a controlled manner by means of, e.g., a piezo-actuator, such that, e.g., the respective hypotenuses of each subprism of an optical switch of subprisms may be moved away from or towards each other or may be pressed towards each other, in order to dynamically control the amount of radiation redirected or resp. transmitted, wherein in particular the radiation incident on the optical switch is completely reflected or redirected when the distance between the respective hypotenuses of the subprisms is greater than the wavelength of the radiation incident on the optical switch, wherein the proportion of transmitted radiation increases upon reducing the distance between the respective hypotenuses of the subprisms, and wherein almost the entire radiation is transmitted by the optical switch when the respective hypotenuses of the subprisms lie against one another.

In a further embodiment, at least one beam splitter may be formed as a fiber.

In the optical system, preferably no beam splitter is arranged in the detection beam path upstream of of the exactly one tube lens, more preferably no optical elements other than lenses are arranged in the optical system in the detection beam path upstream of the tube lens.

The optical system along the excitation beam path may comprise at least one beam splitter which is arranged to redirect the radiation emanating from the radiation source in the direction toward the measuring area. In this embodiment, the exactly one tube lens is preferably arranged in the excitation beam path and the optical system comprises at least one beam splitter along the excitation beam path between the radiation source and the exactly one tube lens, which at least one beam splitter is configured to redirect the radiation emanating from the radiation source towards the second end of the exactly one tube lens. Thereby, the optical system has the advantage that it can be constructed in a space-saving manner.

Preferably, a beam splitter arranged in the excitation beam path is configured such that the radiation emanating from the radiation source impinges on a part of the measuring area and not on the entire measuring area, e.g. by controlled rotation of the beam splitter and/or by redirecting the radiation from a controlledly movable radiation source which may e.g. be a fiber.

The optical system may comprise at least one beam splitter along the excitation beam path between the measuring area and the tube lens, e.g. between the measuring area and the first end of the exactly one tube lens and/or between the measuring area and the first end of the objective, and/or between the first and the second ends of the objective, and/or as part of a Michelson interferometer. In this embodiment, the optical system is preferably arranged for the beam splitter to partially redirect the radiation incident thereon toward a mirror, e.g. a piezo mirror, which is configured to reflect the radiation incident thereon so that the radiation falls back onto the beam splitter and further into the detection beam path. In this embodiment, the beam splitter is preferably configured to transmit the radiation emanating from the measuring area along the detection beam path toward the detectors, and the mirror is preferably arranged along the excitation beam path at the same distance from the beam splitter as the measuring area, in particular at the same distance as the focal plane of the measuring area. The mirror can be movably mounted with respect to the beam splitter and can preferably be controlledly movable. Then the optical system has the advantage that the focal plane in the measuring area is movable along the detection beam path and, for example, optical sectional views through a tissue can be detected. In this embodiment, the optical system may e.g. comprise a Michelson interferometer and preferably a coherent light detector, and may be set up to detect radiation by means of optical coherence tomography.

The optical system comprises detectors in the detection beam path, in particular a first detector having a first detection surface and a second detector having a second detection surface. The detectors are arranged in the detection beam path downstream of the first beam splitter, in particular the first detector is arranged in the reflection direction of the beam splitter and the second reflector is arranged in the transmission direction of the first beam splitter.

The detection surface of a detector is arranged in its detection plane. According to the invention, the detection planes, resp. the detection surfaces of different detectors are spaced apart and arranged along the detection beam path at the same distance from the second end of the exactly one tube lens.

In general, the detectors are set up to detect radiation. Therein, the radiation can be radiation emanating from the measuring area, which is guided along the detection beam path, or radiation emanating from the radiation source, which has been redirected from the excitation beam path through a beam splitter into the detection beam path and has not been guided through the tube lens.

In particular, the detectors are preferably set up to detect optical radiation by converting photons incident on their detection surface into at least one electrical signal. Alternatively, the detectors can be set up to detect optical radiation by picking up the radiation imaged in their detection plane in a scanning lens and redirecting it toward a transducer that converts incident photons into at least one electrical signal. The detectors can be set up such that the radiation can at least partially penetrate through the detection surface and/or can be redirected, e.g. reflected, by the detection surface.

In an embodiment, a detector may be configured such that radiation incident on its detection surface passes through the detection surface and is focused by a scan lens onto a scan mirror, which redirects the radiation through a collimator lens toward a CCD surface as a transducer. In this embodiment, the optical system is preferably set up for signal amplification in that the radiation emanating from its radiation source successively scans parts of the measuring area and the radiation redirected onto parts of the detection surface of the detector is redirected and focused by the scan lens and collimator lens in such a way that it impinges all-over on the entire CCD surface.

Optionally, the detectors are set up independently from one another or identically to detect only that radiation which has a predetermined wavelength and/or polarization, and/or which falls on the detector at a predetermined time and/or from a specific direction.

At least one of the detectors may extend beyond its detection area in the detection beam path. In particular, at least one detector can have optical and/or electronic elements along the detection beam path upstream and/or downstream of its detection surface, which are suitable for generating and/or redirecting and/or reflecting and/or guiding radiation, and/or for amplifying electronic signals, e.g., radiation sources, fibers, beam splitters, reflectors, apertures, and/or lenses. A detector may e.g. comprise a reference arm and/or be set up for travel time measurement of radiation.

The detection surfaces of different detectors are each spaced apart from one another. In particular, the second detection surface of the second detector is spaced apart from the first detection surface of the first detector. In the embodiment in which the optical system comprises a third detector and/or further detectors, these have detection surfaces which are spaced apart from each other and from those of the first and second detectors.

Each detector is arranged in the detection beam path with its detection surface at an angle, which is preferably a right angle, to the detection beam path. Preferably, the detectors are arranged in the detection beam path such that the radiation impinges in perpendicular on their detection surface.

Preferably, the detectors each have, independently from one another or identically, means for enhancing the contrast of the detected signal and/or for reducing noise, e.g. shot noise, e.g. photoelectron multipliers or apertures.

The detectors are preferably, in each case independently from one another or identically, selected from OCT detectors, Raman detectors, photodiodes, fluorescence detectors, XY detection arms, point detectors such as photodiodes, avalanche photodiodes or an array of these, or area detectors, or in particular charge coupled detectors (CCD), optionally with electron multiplier (EMCCD), or complementary metal oxide semiconductors (CMOS, sCMOS). The detectors can be set up to alternatively or additionally detect time-dependent or modulated signals.

According to the invention, the detectors are arranged with their detection surfaces along the detection beam path substantially at the same distance from the second end of the tube lens. In particular, the first and the second detection surfaces of the first and second detectors, respectively, are arranged at the same distance from the second end of the tube lens. Preferably, the distance of the detection surfaces, in particular of the first and second detection surfaces, from the second end of the tube lens along the detection beam path is equal to the working distance of the exactly one tube lens. Thereby, the optical system has the advantage that all detectors detect a focused image signal without the need to arrange and align a separate tube lens for each detector.

Optionally, the optical system may in addition comprise a third detector and may further optionally comprise further detectors. In the embodiment of the optical system having three detectors, it is preferred that the third detector has a third detection surface spaced apart from the first and second detection surfaces, the third detection surface being arranged along the detection beam path at the same distance to the second end of the tube lens as the first and second detection surfaces, and that the optical system has a second beam splitter which is arranged along the detection beam path downstream of the first beam splitter, and in the transmission or reflection direction of which the third detector is arranged.

In the embodiment in which the optical system comprises a third detector, the third detector is arranged in a third detection surface spaced from the first and second detection surfaces, wherein in accordance with the invention the third detection surface is arranged along the detection beam path at the same distance as the first and second detection surfaces from the second end of the exactly one tube lens.

Further optionally, the detectors are interchangeably arranged in the detection beam path, e.g. in the form of detachable and fixable detector cassettes. In this embodiment, preferably one detector is fixable with its detection surface at a predetermined distance from the second end of the tube lens, e.g. by a spacer, and can be exchanged for another detector whose detection surface is fixable at the same distance from the second end of the tube lens. In this embodiment, the optical system has the advantage that detectors can be interchanged for each other in a simple manner and therefore the system can be easily adapted to a particular application.

In a preferred embodiment, at least one detector in its detection surface comprises a fiber and a beam splitter or mirror in the detection beam path upstream of the detection surface. In this embodiment, the fiber is preferably formed as a detection surface and is further preferably movable in a controlled manner along two axes, so that a sample arranged into the measuring area can be scanned by moving the fiber. In this embodiment, the fiber is optionally additionally clad and is configured to radiate radiation from its clad core toward the beam splitter and, behind it, to the measuring area, and to receive radiation emanating from the measuring area into its cladding and to detect it. To detect radiation from the measuring area, a partial area of the measuring area is irradiated with light emitted from the fiber and the reflected or emitted radiation from this area is detected by the fiber. By subsequently moving the fiber, the irradiating and detecting can be repeated for another partial area of the measuring area. Due to the punctual irradiating and detecting, the optical system in this embodiment has the advantage that light from other partial areas of the measuring area is not detected and thus a low-noise signal can be generated by the detector.

The components of the optical system described here, which are configured to carry out a method, describe the method steps of the methods that can be carried out with them.

Alternatively optionally, in the detection surface of at least one detector the optical system has a fiber that is movable along two axes in the plane of the detection surface or resp. in the detection plane, and a radiation source that is movable in a controlled manner along two axes is arranged in the optical system. In this embodiment, the optical system is preferably set up such that the fiber and radiation source are moved in coordination with each other, so that a partial area of the measuring area is irradiated by the radiation source and only radiation from the same partial area is detected by the fiber. In order to detect radiation from the measuring area, an area of the measuring area is irradiated with light by the radiation source, and the diffracted, scattered, reflected or emitted radiation from this area is detected by the fiber. By subsequently moving the fiber, the irradiation and detection can be repeated for a further area of the measuring area. Due to the punctual irradiation and detection, the optical system in this embodiment has the advantage that light from other partial areas of the measuring area is not detected and thus a low-noise signal can be generated by the detector.

Further optionally, at least one detector may be formed at least in sections by a fiber, e.g., in a section which runs in the detection beam path downstream of the detection surface and in which light from the detection surface is guided to a reflector arranged at the end of the fiber lying opposite to the detection surface and light reflected from the reflector is guided back to the detection surface. In this embodiment, for example, a detection arm of an optical coherence tomography (OCT) detector may be formed of a fiber and the optical system may be set up such that radiation from the radiation source is partially redirected by a beam splitter in a direction away from the tube lens into the detection beam path and therefore is in part not guided through the tube lens.

Further optionally, the optical system can have a localization device which is set up to determine and align the position of the radiation source, e.g. of a laser, along two axes. For this purpose, the radiation source of the optical system is preferably movable in a controlled manner along a first axis and, at an angle thereto, along a second axis starting from a zero point, wherein the two axes span a plane at right angles to the excitation beam path of the radiation source and preferably are perpendicular to one another. For this purpose, the optical system in this embodiment along the excitation beam path comprises a beam splitter which is configured to redirect the radiation of the radiation source in the direction of an XY detection arm. Preferably, the XY detection arm comprises a beam splitter in each of the reflection direction and transmission directions of which a detector for the radiation of the radiation source is arranged, wherein one detector is configured to determine the location of the radiation incident thereon and to determine therefrom the displacement relative to the zero point along the first axis, and the other detector is configured to determine the location of the radiation incident thereon and to determine therefrom the displacement relative to the zero point along the second axis. Alternatively, the XY detection arm may comprise at least one detector which is configured to determine the location of the radiation incident thereon and therefrom the displacement relative to the zero point along each of the two axes, for example a CCD detector or a CMOS detector. Further preferably, in this embodiment, the optical system comprises a control device which is configured to move the radiation source along the first and/or second axis towards the zero point depending on the determined signal from the two detectors. Therein, the zero point is preferably a point at which the radiation emanating from the radiation source radiates at least partially onto the center of the detection surface of the first and/or second detector.

In a further preferred embodiment, the optical system in its detection beam path comprises a second XY detection arm, the control device of which is configured to move the radiation source of a second optical system along the first and/or second axis in the direction of the zero point depending on the determined signal of the two detectors of the second XY detection arm. In the embodiment of the optical system comprising a first and a second XY detection arm, it is preferred that the optical system is arranged in an arrangement of a first and a second optical system with a common measuring area, which is preferably arranged between the two optical systems, wherein preferably the excitation beam path of the first optical system is directed through the common measuring area towards the tube lens of the second optical system and the excitation beam path of the second optical system is directed through the common measuring area towards the tube lens of the first optical system, such that the excitation beam path of the first optical system and the detection beam path of the second optical system overlap on a portion of their surfaces. The portion of overlap of the surfaces can be determined, for example, by localizing the radiation incident on the detectors arranged in the XY detection arm and is preferably a portion of at least 80%, preferably at least 90%, at least 95% or at least 99%.

In a preferred embodiment, the optical system comprises a radiation source comprising a fiber and a controlled scanning mirror, which radiation source is configured to generate radiation along the excitation beam path toward the measuring area and to scan the measuring area with radiation by controlled movement of the scanning mirror.

In another embodiment, the optical system comprises a detector comprising a fiber and a controlled scanning mirror, wherein the fiber is arranged in the detection surface of the detector, and the detector is configured such that portions of the image signal are sequentially reflected into the fiber by controlled movement of the scanning mirror.

In a preferred embodiment for the detection of LIDAR signals, the optical system preferably comprises a pulsed laser as radiation source, exactly one tube lens, further a fiber having a length of 10 m and having a first end and an opposite second end, the first end being directed towards the measuring area and the second end being directed towards the exactly one tube lens, a semi-transparent mirror as a beam splitter, a light pulse detector as first detector and a further light pulse detector as second detector, wherein the first and second detectors each have a detection rate of at least 50 MHz. In the excitation beam path, a beam splitter is arranged between the radiation source and the fiber, which beam splitter directs the radiation partially onto the fiber and partially onto a mirror arranged in the excitation beam path in a plane conjugate to the first end of the fiber, which mirror reflects the radiation incident thereon in the direction of the exactly one tube lens and the detectors behind it.

In the method for detecting radiation from a measuring area by means of LIDAR, which can be carried out in this embodiment, a sample from which the distance is to be determined is arranged in the measuring area. Radiation emanating from the radiation source is directed in the excitation beam path towards the beam splitter arranged there, which directs the radiation partially towards the second end of the fiber and partially towards the mirror. Since the mirror is arranged in a plane conjugate to the first end of the fiber, the radiation reflected by it and guided through the tube lens and through a first beam splitter is detected in the first detector as a reference value for the travel time of the radiation. The radiation guided through the fiber to the measuring area is redirected in the measuring area in the direction of the first end of the fiber and is guided in the detection beam path through the exactly one tube lens and the first beam splitter and is detected in the transmission direction thereof on the detection surface of the second detector and is determined as a value for the travel time of the light.

In a further preferred embodiment for the detection of OCT signals, the optical system has a superluminescent diode having an average wavelength of at least 830 up to 1325 nm as a radiation source, furthermore a clad fiber having a first end and a second end, which fiber is arranged in the detection beam path between the measuring area and the exactly one tube lens and at first end of which fiber, directed towards the measuring area, a lens is arranged which extends over the cross section of the fiber, and at the first end of which fiber a reflector is arranged which extends exclusively over the region of the cladding of the fiber and not over its core, additionally exactly one tube lens, a controllable optical switch as a first beam splitter, in the transmission direction of which an interference detector is arranged as a first detector and in the reflection direction of which a wavelength detector for the wavelength of the radiation of the superluminescent diode is arranged as a second detector, wherein the first and second detectors are arranged with their detection surfaces along the detection beam path at the same distance from the exactly one tube lens.

In the method for detecting radiation from a sample using OCT, which can be carried out in the preferred embodiment, a tissue sample, e.g. skin, is placed in the measuring area. Radiation emanating from the radiation source is guided through the excitation beam path into the second end of the fiber, wherein both core and cladding of the fiber are irradiated. The radiation guided in the core of the fiber is focused toward the sample by the lens located at the first end of the fiber and is redirected from the sample toward the fiber. Radiation guided in the cladding of the fiber is reflected by the reflector located at the first end of the fiber and is redirected toward the second end of the fiber. The radiation exits the second end of the fiber through the detection beam path and is focused by the exactly one tube lens. From the first beam splitter, the radiation is partially redirected to the first detector and is partially transmitted to the second detector. Due to the phase shift between radiation redirected by the sample and radiation redirected by the reflector, a radiation interference pattern is created that is detected by the first detector. In the second detector, the radiation which is incident on its detection surface and which has the same wavelength as the radiation generated by the radiation source is detected. Thus, the optical system is set up to simultaneously detect a bright field image of the sample placed in the measuring area and an OCT interference measurement.

The invention will now be described in more detail and with reference to the figures, which show in FIG. 1 a schematic view of an embodiment of the optical system, FIG. 2 a schematic view of a further embodiment of the optical system, FIG. 3 a schematic view of an embodiment of the optical system having a reference arm, FIG. 4 a schematic view of an embodiment of the optical system having a movable radiation source and fiber, FIG. 5 a schematic view of an embodiment of the optical system having a movable fiber, and FIG. 6 a schematic view of an embodiment of the optical system having an XY detection arm.

Figure 3:
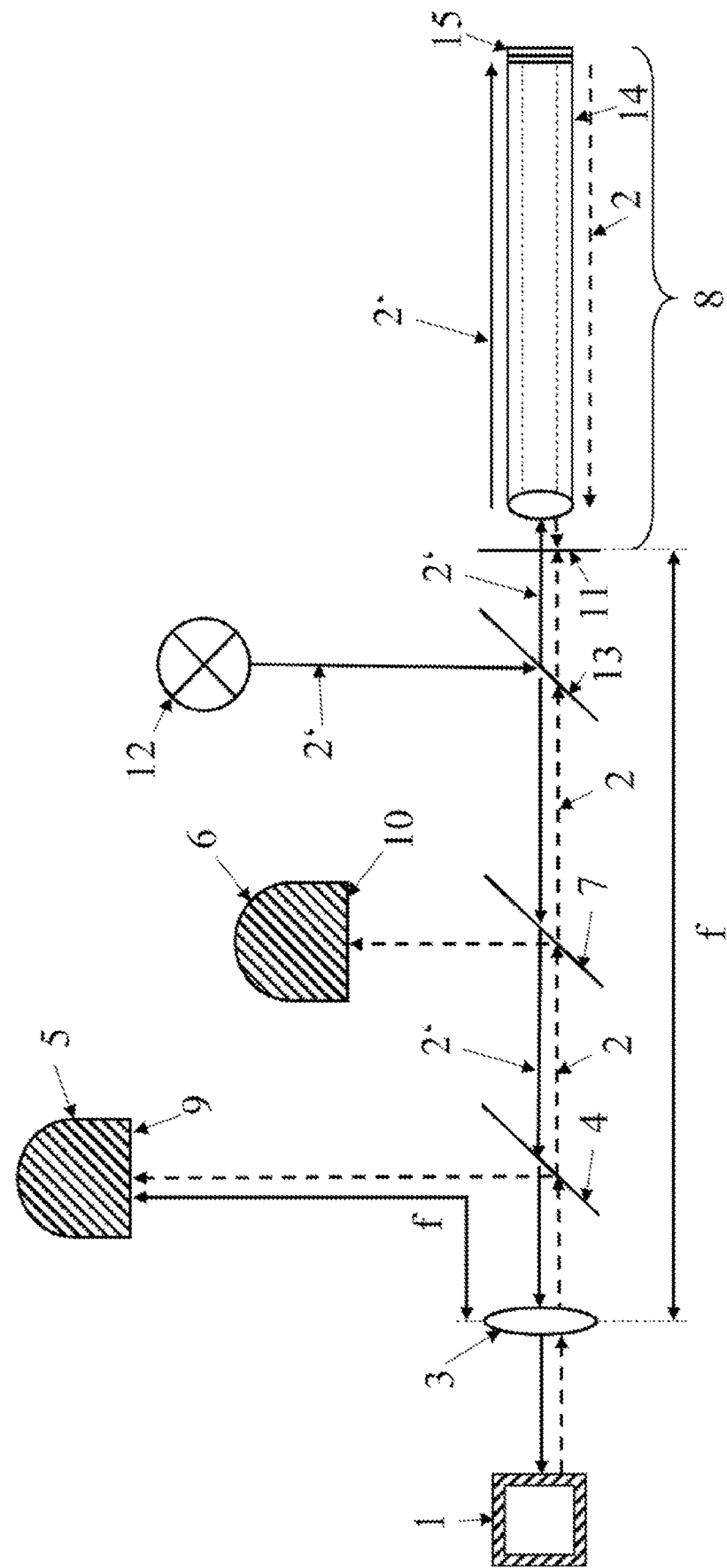
Figure 4:
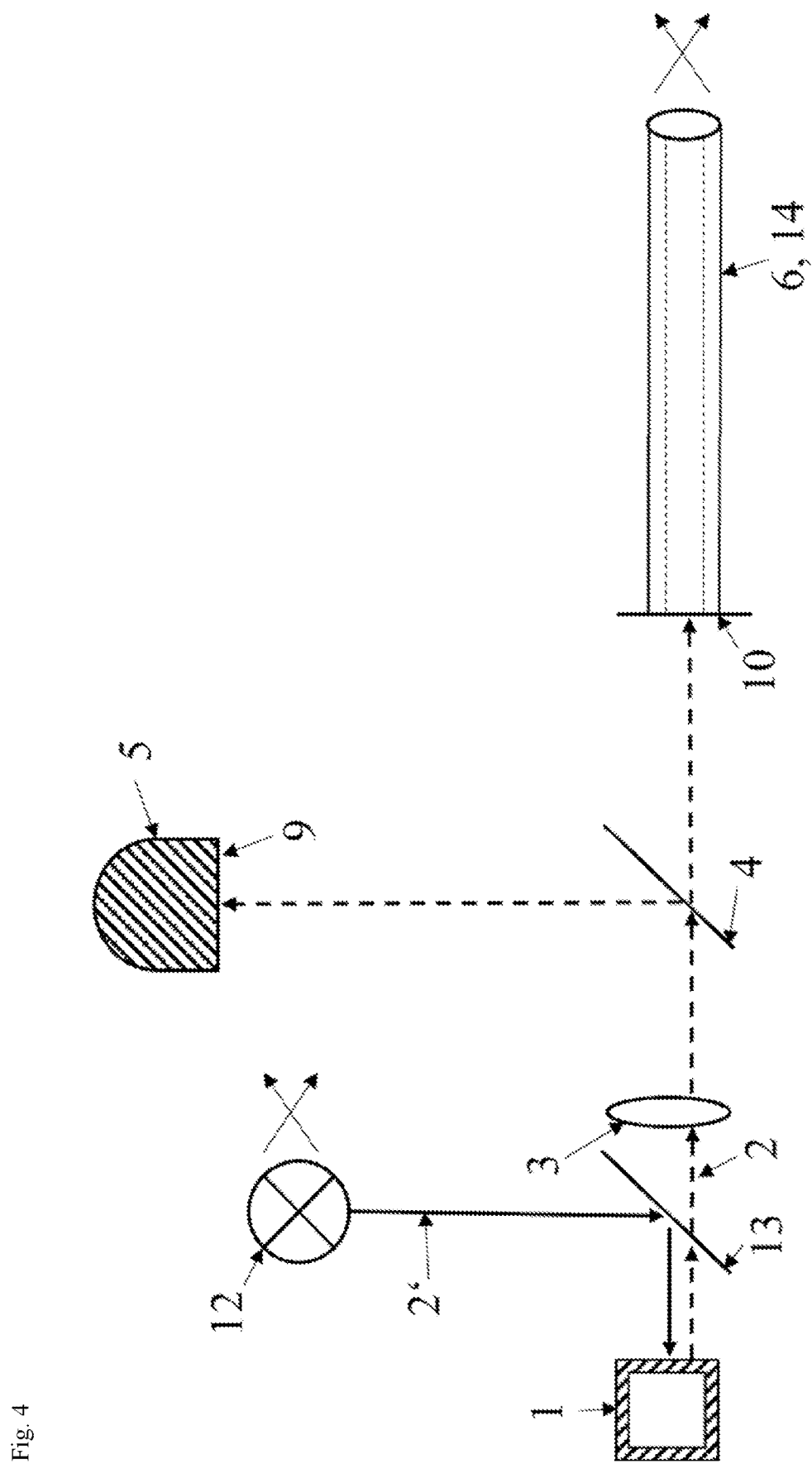
Figure 5:
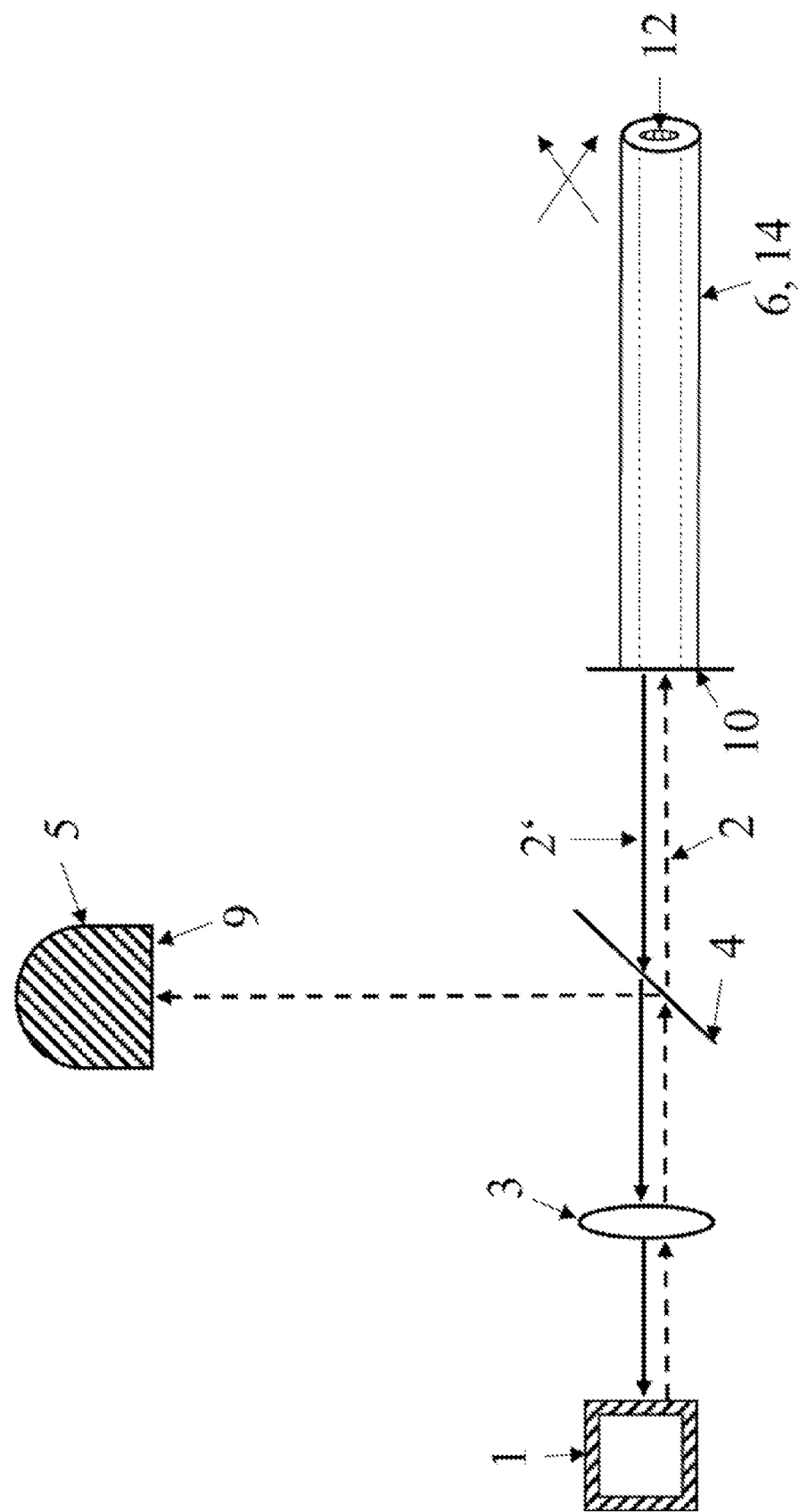

Therein, in FIGS. 3-5, the detection beam path 2 and the excitation beam path 2' are shown separately for a better overview.

FIG. 1 shows a schematic view of the detection beam path of the optical system for detecting radiation from a measuring area 1 along a detection beam path 2 which guides radiation from the measuring area 1 onto a first detector 5 and onto a second detector 6, wherein along the detection beam path 2 there are arranged in succession exactly one tube lens 3 having a first end and an opposite second end, a first beam splitter 4, a first detector 5 in the reflection direction of the first beam splitter 4, and a second detector 6 in the transmission direction of the first beam splitter 4. The first detector 5 has a first detection surface 9, and the second detector 6 has a second detection surface 10 which is spaced apart from the first detection surface 9. The first and second detection surfaces 9, 10 are arranged along the detection beam path 2 at the same distance f from the second end of the tube lens 3.

Radiation emanating from the measuring area 1 propagates along the detection beam path 2 and is focused by the tube lens 3. The beam splitter 4 arranged in the detection beam path 2 redirects a part of the radiation in its reflection direction to the first detector 5 and allows a part of the radiation to pass through in its transmission direction to the second detector 6. Due to the equal distance f of each detection surface 9, 10 along the detection beam path 2 to the second end of the tube lens 3, a simultaneous detection of the radiation by the detectors 5, 6 is made possible.

Figure 2:
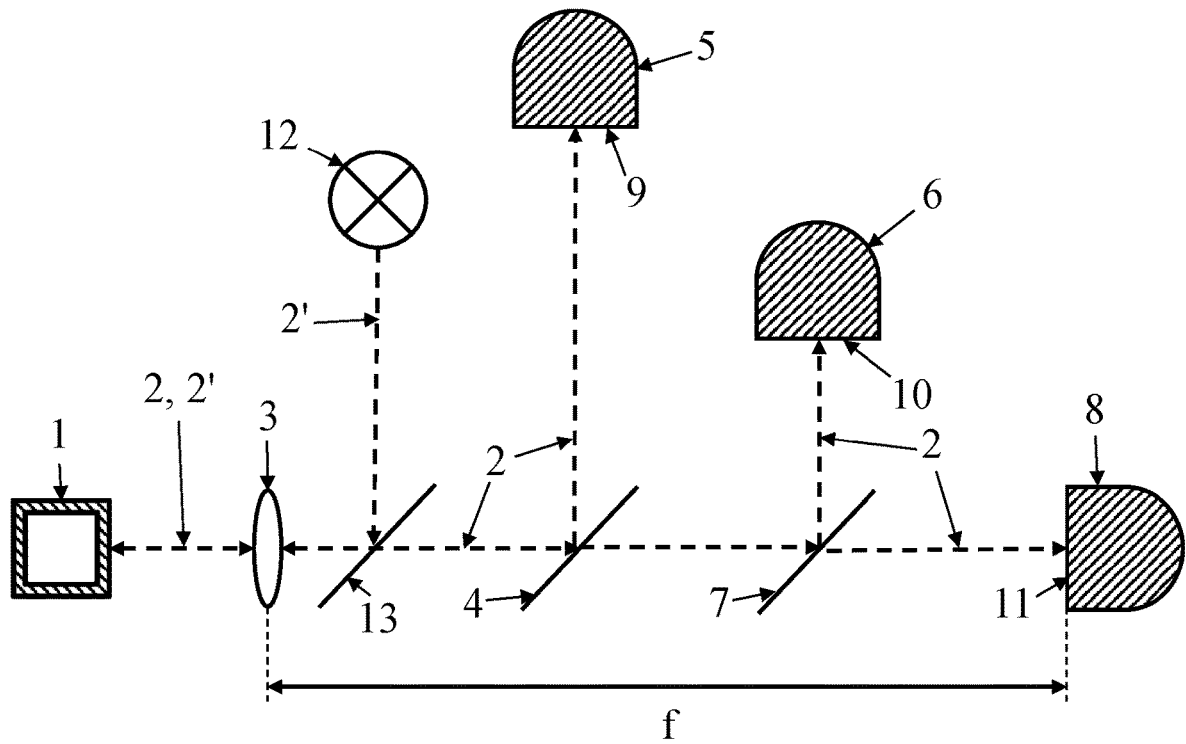

FIG. 2 shows a schematic view of an embodiment of the optical system comprising a radiation source 12, one tube lens 3, three beam splitters 4, 7, 12 and three detectors 5, 6, 8 with their detection surfaces 9, 10, 11. The detection surfaces 9, 10, 11 are arranged along the detection beam path 2 at the same distance f from the second end of the tube lens.

Radiation generated by the radiation source 12 is guided along the excitation beam path 2' and is redirected by a third beam splitter 13 toward the tube lens 3 and the measuring area 1. In the section between the measuring area 1 and the third beam splitter 13, the excitation beam path 2' and detection beam path 2 run along the same light path. Radiation emanating from the measuring area 1 is focused by the tube lens 3 arranged in the detection beam path 2. The first beam splitter 4 arranged in the detection beam path 2 redirects a part of the radiation in its reflection direction onto the first detector 5 and allows a part of the radiation to pass through in its transmission direction to the second beam splitter 7. The latter again redirects a part of the radiation in its reflection direction to the second detector 6 and allows a part of the radiation to pass through in its transmission direction to the third detector 8. Due to the equal distance f of each detection surface 9, 10, 11 along the detection beam path 2 to the second end of the tube lens 3, the radiation is simultaneously detected by the detectors 5, 6, 8.

FIG. 3 shows a schematic view of an embodiment of the optical system having a radiation source 12, one tube lens 3, three beam splitters 4, 7, 12 and three detectors 5, 6, 8 with their detection surfaces 9, 10, 11. The detection surfaces 9, 10, 11 are arranged along the detection beam path 2 at the same distance f from the second end of the tube lens (shown by way of example for the first and third detection surfaces 9, 11). The third detector 8 extends in the detection beam path 2 downstream of its detection surface 11 and has an optical fiber 14 with a reflector 15 which, according to the figure, is arranged at the right end.

Radiation generated by the radiation source 12 propagates along the excitation beam path 2' and on the one side is redirected by a third beam splitter 13 in the direction of the tube lens 3 and the measuring area 1, and in the direction of the third detector 8 and through its detection surface 11. Through the optical fiber 14 of the third detector 8, the radiation is guided along the excitation beam path 2' to the reflector 15 and is reflected by it. Along the detection beam path 2, the radiation is guided through the optical fiber in the opposite direction to the left according to the figure onto the third detection surface 11. Therein, the distance of the reflector 15 from the third beam splitter 13 is equal to the distance of the third beam splitter 13 from the first end of the tube lens 3.

In the section between the measuring area 1 and the third beam splitter 13, excitation beam path 2' and detection beam path 2 run along the same light path. Radiation emanating from the measuring area 1 is focused by the tube lens 3 arranged in the detection beam path 2. The first beam splitter 4 arranged in the detection beam path 2 redirects a part of the radiation in its reflection direction onto the first detector 5 and allows a part of the radiation to pass through in its transmission direction to the second beam splitter 7. The latter again redirects a part of the radiation in its reflection direction to the second detector 6 and allows a part of the radiation to pass through in its transmission direction to the third beam splitter 13. The latter allows a part of the radiation to pass through in its transmission direction to the third detector 8. Due to the equal distance f of each detection surface 9, 10, 11 along the detection beam path 2 to the second end of the tube lens 3, the radiation from the measuring area 1 is detected simultaneously by the detectors 5, 6, 8.

FIG. 4 shows the optical system in an embodiment for detecting radiation from a measuring area 1 along a detection beam path 2 that guides radiation from the measuring area 1 onto a first detector 5 and onto a second detector 6, wherein exactly one tube lens 3 having a first end and an opposite second end, a first beam splitter 4, a first detector 5 in the reflection direction of the first beam splitter 4, and a second detector 6 in the transmission direction of the first beam splitter 4 are arranged successively along the detection beam path 2. The first detector 5 has a first detection surface 9 and the second detector 6 has a second detection surface 10 which is spaced from the first detection surface 9. A fiber 14 which is movable along two axes is arranged in the detection surface 10 of the second detector 6. Further, a radiation source 12 which is movable along two axes in a controlled manner is arranged in the optical system. Fiber 14 and radiation source 12 are moved in coordination with one another, so that a partial area of the measuring area 1 is irradiated by the radiation source 14 and only radiation from the same partial area is detected by the fiber 14. For detecting radiation from the measuring area 1, a partial area of the measuring area 1 is irradiated by the radiation source 12 and the reflected or resp. emitted radiation from this partial area is detected by the fiber 14. By subsequently moving the fiber 14, the irradiating and detecting can be repeated for another partial area of the measuring area 1.

FIG. 5 shows a preferred embodiment of the optical system for detecting radiation from a measuring area 1 along a detection beam path 2 which guides radiation from the measuring area 1 onto a first detector 5 and onto a second detector 6, wherein exactly one tube lens 3 having a first end and an opposite second end, a first beam splitter 4, a first detector 5 in the reflection direction of the first beam splitter 4 and a second detector 6 in the transmission direction of the first beam splitter 4 are arranged successively along the detection beam path 2. The first detector 5 has a first detection surface 9 and the second detector 6 has a second detection surface 10 which is spaced from the first detection surface 9. The second detector 6 has a fiber 14 in its detection surface 10, and a beam splitter 4 in the detection beam path 2 upstream of the detection surface 10. The fiber 14 is controlledly movable along two axes, so that a sample arranged in the measuring area 1 can be scanned by moving the fiber 14. The fiber 14 is clad and configured as a radiation source 12 to radiate radiation from its clad core toward the beam splitter 4 and the measuring area 1 behind it, and to receive radiation emanating from the measuring area 1 into its cladding and to detect it. For detecting radiation from the measuring area 1, a partial area of the measuring area 1 is irradiated with light emitted from the fiber 14, and the reflected or emitted radiation from this area is detected by the fiber 14. By subsequently moving the fiber 14, the irradiating and detecting can be repeated for another partial area of the measuring area 1.

Figure 6:
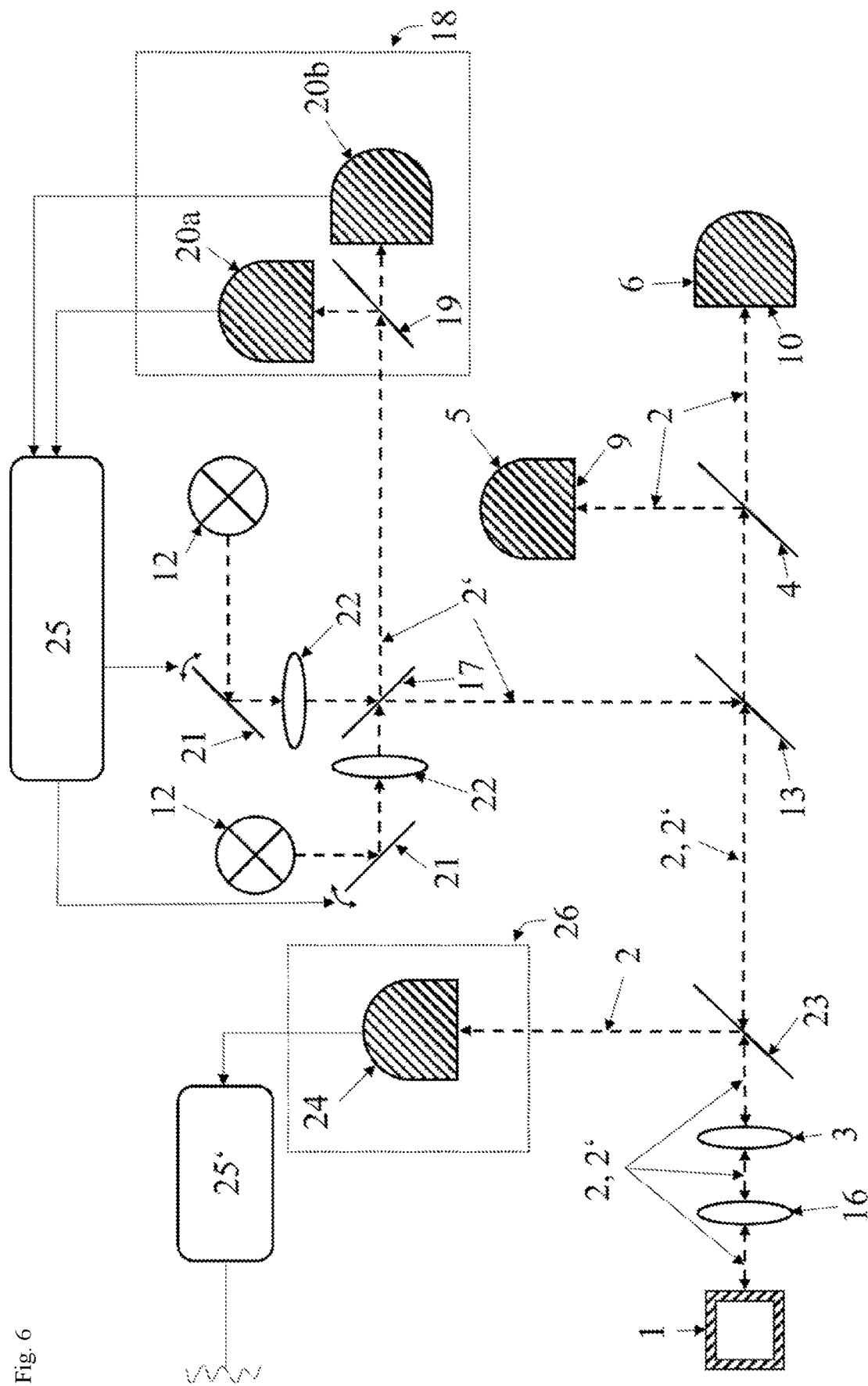

FIG. 6 shows an embodiment of the optical system for detecting radiation from a measuring area 1 along a detection beam path 2 which guides radiation from the measuring area 1 onto a first detector 5 and a second detector 6, wherein an objective 16, exactly one tube lens 3 having a first end and an opposite second end, a first beam splitter 4, a first detector 5 in the reflection direction of the first beam splitter 4 and a second detector 6 in the transmission direction of the first beam splitter 4 are arranged successively along the detection beam path 2. The first detector 5 has a first detection surface 9 and the second detector 6 has a second detection surface 10 which is spaced from the first detection surface 9.

According to FIG. 6, two radiation sources 12 are arranged in the optical system, which can be moved in a controlled manner along a first axis and at an angle thereto along a second axis, starting from a zero point by the radiation sources 12 each having a tiltable mirror 21 and a scanning objective 22, wherein the tilting of a mirror 21 produces a displacement of the excitation beam path 2' of a radiation source 12 along at least one of the two axes. Therein, the zero point is a point at which the radiation emitted by the radiation source 12 radiates at least partially onto the center of the detection surfaces 9, 10 of the first and/or second detectors 5, 6. Furthermore, in the optical system in this embodiment along the excitation beam path 2', a beam splitter 17 is arranged which is configured to redirect the radiation from the radiation source 12 in the direction of an XY detection arm 18.

The XY detection arm 18 is a localization device that is set up to determine and align the position of the radiation sources 12 along two axes. For this purpose, in the XY detection arm 18 according to FIG. 6, a beam splitter 19 is arranged, in the reflection direction of which a detector 20a and in the transmission direction of which a detector 20b for the radiation of the radiation source 12 is arranged, wherein one of the detectors 20a, 20b is configured to determine the location of the radiation incident thereon, and to determine therefrom the displacement in comparison to a zero point along the first axis, and the other one of the detectors 20a, 20b is configured to determine the location of the radiation incident thereon and to determine therefrom the displacement in comparison to a zero point along the second axis. In this embodiment, the detectors 20a, 20b of the XY detection arm are arranged with their detection surfaces along the excitation beam path 2' at a distance from the scanning objectives 22 that is their focal length. Further, the optical system has a control device 25 which is configured to tilt the mirrors 21 depending on the signal determined by the two detectors 20a, 20b and to thereby move the radiation sources 12 along the first and/or second axes towards the zero point.

Further, in the embodiment shown in FIG. 6, the optical system comprises a second XY detection arm 26 in its detection beam path 2. Radiation is redirected onto the second XY detection arm by a beam splitter 23 arranged in the detection beam path 2, and the location of the radiation incident thereon and from this the displacement in comparison to a zero point along a first and/or second axis is determined by the detector 24 of the second XY detection arm. The control device 25' of the second XY detection arm 26 is configured to move the radiation source of a second optical system, not shown in FIG. 6, toward a zero point along the first and/or second axis depending on the signal determined by the detector 24. According to FIG. 6, the detector 24 is arranged with its detection surface at a distance from the exactly one tube lens 3, which distance is the latter's focal length. The control device 25' of the second XY detection arm 26 is configured to move the radiation source of a second optical system, which is movable along two axes, along the first and/or second axis in the direction of a zero point depending on the signal determined by the detector 24 of the second XY detection arm 26.

Alternatively to the embodiment shown in FIG. 6, the detectors 20a, 20b of the XY detection arm 18 may be formed by a single detector, analogous to the arrangement of the detector 24 in the second XY detection arm 26, and the detector 24 of the second XY detection arm 26 may be formed by an arrangement of a beam splitter and two detectors, analogous to the arrangement of the beam splitter 19 and the detectors 20a, 20b of the XY detection arm 18.

| Reference numerals list | |
|---|---|
| 1 | measuring area |
| 2 | detection beam path |
| 2' | excitation beam path |
| 3 | tube lens |
| 4 | first beam splitter |
| 5 | first detector |
| 6 | second detector |
| 7 | second beam splitter |

-continued

| Reference numerals list | |
|---|---|
| 8 | third detector |
| 9 | first detection surface |
| 10 | second detection surface |
| 11 | third detection surface |
| 12 | radiation source |
| 13 | third beam splitter |
| 14 | optical fiber |
| 15 | reflector |
| 16 | objective |
| 17 | beam splitter |
| 18 | XY detection arm |
| 19 | beam splitter |
| 20a | detector |
| 20b | detector |
| 21 | mirror |
| 22 | scanning objective |
| 23 | beam splitter |
| 24 | detector |
| 25 | control device |
| 25' | control device |
| 26 | second XY detection arm |
| f | distance |

The invention claimed is:

1. An optical system for detecting radiation from a measuring area, comprising:
   at least one radiation source arranged to radiation along an excitation beam path that guides radiation from the radiation source to the measuring area;
   a detection beam path that guides radiation from the measuring area to at least a first and a second detector; the detection beam path comprising in succession exactly one tube lens comprising a first end and an opposite second end, a first beam splitter, a first detector in a reflection direction of the first beam splitter and a second detector in a transmission direction of the first beam splitter;
   wherein the first detector comprises a first detection surface and the second detector comprises a second detection surface spaced from the first detection surface;
   wherein the first and second detection surfaces are arranged along the detection beam path at the same distance (f) from the second end of the tube lens, the system further comprising a third detector comprising a third detection surface spaced from the first and second detection surfaces, the third detection surface being affair arranged along the detection beam path at the same distance (f) from the second end of the tube lens: and
   a second beams splitter is arranged along the detection beam path downstream of the first beam splitter and in a transmission or reflection direction in which the third. detector is arranged.

2. The optical system according to claim 1, wherein the distance (f) is equal to a working distance of the exactly one tube lens.

3. The optical system according claim 1, wherein no beam splitter is arranged in the detection beam path upstream of the exactly one tube lens.

4. The optical system according to claim 1, wherein no optical elements other than lenses are arranged in the detection beam path upstream of the exactly one tube lens.

5. The optical system according to claim 1, wherein the radiation generated by the radiation source is guided in the excitation beam path through the exactly one tube lens.

6. The system according to claim 1, wherein the tube lens, the first beam splitter, and the first detector are arranged such that a sample can be arranged at a fixed distance in front of the exactly one tube lens in the common housing.

7. The optical system according to claim 1, wherein the detection beam path is at least sectionally filled with liquid.

8. The optical system according to claim 1, wherein the detection beam path is at least sectionally formed by a fiber.

9. The optical system according to claim 1, comprising a lens array as an objective in the detection beam path upstream of the exactly one tube lens, the lenses of the objective being mounted movably or fixedly with respect to the exactly one tube lens, wherein the optical system in its detection beam path has an infinity region in the region between the first end of the objective and the second end of the tube lens.

10. The optical system according to claim 1, wherein the first beam splitter comprises an optical switch configured to control the redirection or transmission of radiation depending on a predetermined signal.

11. The optical system according to claim 1, comprising optical elements configured for redirecting and/or reflecting and/or guiding radiation upstream or downstream of the first, second and/or third detection surfaces.

12. An optical system for detecting radiation from a measuring area, comprising:
at least one radiation source arranged to radiation along an excitation beam path that guides radiation from the radiation source to the measuring area;
a detection beam path that guides radiation from the measuring area to at least a first and a second detector; the detection beam comprising in succession exactly one tube lens comprising a first end and an opposite second end, a first beam splitter, a first detector in a reflection direction of the first beam splitter and a second detector in a transmission direction of the first beam splitter;
wherein the first detector comprises a first detection surface and the second detector comprises a second detection surface spaced from the first detection surface;
wherein the first and second detection surfaces are arranged along the detection beam at the same distance (f) from the second end of the tube lens, wherein the radiation source of the optical system is controllably movable along a first axis and at an angle thereto along a second axis starting from a zero point, wherein the two axes span a plane at right angles to the excitation beam path;
wherein a beam splitter is configured to redirect the radiation towards an XY detection arm;
wherein the XY detection arm comprises a beam splitter in the reflection direction and transmission direction of which one detector each for the radiation of the radiation source is arranged, wherein the one detector) is configured to determine the location of the radiation incident thereon and to determine therefrom the displacement relative to the zero point along the first axis, and wherein the other detector is configured to determine the location of the radiation incident thereon and to determine therefrom the displacement relative to the zero point along the second axis,
and the optical system comprises a control device configured to move the radiation source along the first and/or second axis towards the zero point in dependence on the determined signal of the two detectors.

13. The optical system according to claim 12, comprising a second XY detection arm comprising at least one detector configured to determine the location of radiation incident thereon and to determine therefrom the displacement relative to a zero point along a first and/or second axis, and a control device configured to move the radiation source of a second optical system in dependence on the determined signal of the at least one detector of the second XY detection arm along a first and/or second axis towards a zero point.

* * * * *